(12) United States Patent
Bodziony et al.

(10) Patent No.: US 10,360,240 B2
(45) Date of Patent: *Jul. 23, 2019

(54) PROVIDING MULTIDIMENSIONAL ATTRIBUTE VALUE INFORMATION

(71) Applicant: INTERNATIONAL BUSINESS MACHINES CORPORATION, Armonk, NY (US)

(72) Inventors: Michal Bodziony, Tegoborze (PL); Lukasz Gaza, Jankowice (PL); Artur M. Gruszecki, Cracow (PL); Tomasz Kazalski, Balice (PL); Konrad K. Skibski, Zielonki (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 306 days.

This patent is subject to a terminal disclaimer.

(21) Appl. No.: 15/230,509

(22) Filed: Aug. 8, 2016

(65) Prior Publication Data

US 2018/0039689 A1 Feb. 8, 2018

(51) Int. Cl.
*G06F 17/30* (2006.01)
*G06F 16/28* (2019.01)

(52) U.S. Cl.
CPC .................. *G06F 16/283* (2019.01)

(58) Field of Classification Search
None
See application file for complete search history.

(56) References Cited

U.S. PATENT DOCUMENTS 6,973,452 B2 * 12/2005 Metzger .............. G06F 16/2282
9,141,648 B1    9/2015 Birnbaum et al.
(Continued)

OTHER PUBLICATIONS

Bodziony, et al., "Providing Multidimensional Attribute Value Information"; U.S. Appl. No. 15/792,818, filed Oct. 25, 2017.
(Continued)

*Primary Examiner* — Hung D Le
(74) *Attorney, Agent, or Firm* — Cantor Colburn LLP; Robert Bunker

(57) ABSTRACT

The invention relates to a method, computer program product and computer system for providing attribute value information for a data extent comprising a set of data entries. For each multidimensional reference point of a set of one or more multidimensional reference points the method comprises: calculating for each multidimensional data entry a reference-point-specific distance between the respective multidimensional data entry and the multidimensional reference point resulting in a set of reference-point-specific distances for the data extent, the respective reference-point-specific distance being calculated using a combination of the attribute values of the multidimensional data entry and a combination of the reference attribute values of the respective multidimensional reference point; determining a minimum reference-point-specific distance and a maximum reference-point-specific distance of the set of reference-point-specific distances; storing for the data extent as attribute value information for further use with query processing the minimum reference-point-specific distance and maximum reference-point-specific distance.

19 Claims, 4 Drawing Sheets

(56) References Cited

U.S. PATENT DOCUMENTS

| | | | |
|---|---|---|---|
| 9,953,065 B2 | 4/2018 | Gaza et al. | |
| 2004/0117359 A1* | 6/2004 | Snodgrass | G06F 16/2477 |
| 2011/0082855 A1* | 4/2011 | Al-Omari | G06F 16/2246 |
| | | | 707/715 |
| 2011/0145223 A1* | 6/2011 | Cormode | G06F 17/30536 |
| | | | 707/722 |
| 2011/0313979 A1* | 12/2011 | Roberts | G06F 16/2365 |
| | | | 707/690 |
| 2014/0095520 A1 | 4/2014 | Ziauddin et al. | |
| 2015/0035833 A1* | 2/2015 | Hao | G06T 11/206 |
| | | | 345/440 |
| 2015/0220617 A1* | 8/2015 | Luo | G06F 17/30598 |
| | | | 707/737 |
| 2015/0370857 A1* | 12/2015 | Nica | G06F 17/30539 |
| | | | 707/752 |
| 2015/0379166 A1* | 12/2015 | Xin | G06F 17/18 |
| | | | 703/2 |
| 2016/0004740 A1* | 1/2016 | Bendel | G06F 16/2282 |
| | | | 707/737 |
| 2016/0155278 A1* | 6/2016 | Nozawa | G01K 3/10 |
| | | | 701/22 |
| 2016/0350396 A1* | 12/2016 | Blanc | G06F 17/30575 |
| 2016/0359886 A1* | 12/2016 | Yadav | H04L 63/1425 |
| 2017/0180497 A1* | 6/2017 | Comstock | H04L 67/22 |

OTHER PUBLICATIONS

List of IBM Patents or Patent Applictions Treated as Related; (Appendix P), Date Filed Oct. 25, 2017; 2 pages.
List of IBM Patents or Patent Applictions Treated as Related; (Appendix P), Date Filed Aug. 8, 2016; 2 pages.
U.S. Appl. No. 15/230,508, filed Aug. 8, 2016; Entitled: Attribute Value Information for a Data Extent.
Bodziony et al., "Attribute Value Information for a Data Extent" U.S. Appl. No. 15/691,614, filed Sep. 7, 2017, 2017.
List of IBM Patents or Patent Applications Treated as Related; (Appendix P), Date Filed Sep. 7, 2017; 2 pages.
List of IBM Patents or Patent Applications Treated as Related; (Appendix P), Date Filed Nov. 7, 2018; 2 pages.

\* cited by examiner

PROVIDING MULTIDIMENSIONAL ATTRIBUTE VALUE INFORMATION

BACKGROUND

The present disclosure relates to the field of digital computer systems and, more specifically, to a method for providing attribute value information for a data extent.

One of the challenges of modern data warehouses is the amount of data which has to be processed per each query. Analytical database systems manage very large amounts of data and are optimized for queries that may read large portions of it. In order to limit the resource consumption and amount of I/O operations for example on disks, usually being the bottleneck of the whole system, not all data is read from disk, but only a preselected portion of data. If a query is searches for data which has nothing in common with a data extent on the disk, the respective data extent is not read from the disk at all. Hence, there is a continuous need to improve data selection performance in analytical database systems.

SUMMARY

Various embodiments provide a method for providing attribute value information for a data extent, a computer system and a computer program product as described by the subject matter of the independent claims. Advantageous embodiments are described in the dependent claims. Embodiments of the present invention can be freely combined with each other if they are not mutually exclusive.

In one aspect, the invention relates to a computer-implemented method for providing attribute value information for a data extent comprised by a database. The data extent comprises a set of multidimensional data entries. Each multidimensional data entry comprises for each attribute of a set of attributes an attribute value assigned to the respective attribute. The database further comprises a set of one or more multidimensional reference points. Each multidimensional reference point comprises for each attribute of the set of attributes a reference attribute value assigned to the respective attribute. For each multidimensional reference point the following is performed: For each multidimensional data entry a reference-point-specific distance between the respective multidimensional data entry and the multidimensional reference point is calculated resulting in a set of reference-point-specific distances for the data extent. The respective reference-point-specific distance is calculated using a combination of the attribute values of the respective multidimensional data entry and a combination of the reference attribute values of the multidimensional reference point. A minimum reference-point-specific distance and a maximum reference-point-specific distance of the set of reference-point-specific distances are determined. The minimum reference-point-specific distance and maximum reference-point-specific distance are stored for the data extent as attribute value information for further use with query processing.

In a further aspect, the invention relates to a computer program product. The computer program product comprises a computer-readable storage medium having computer-readable program code embodied therewith. The computer-readable program code is configured to implement the method according to embodiments disclosed herein.

In yet a further aspect, the invention relates to a computer system for providing attribute value information for a data extent comprised by a database. The data extent comprises a set of multidimensional data entries. Each multidimensional data entry comprises for each attribute of a set of attributes an attribute value assigned to the respective attribute. The database further comprises a set of one or more multidimensional reference points. Each multidimensional reference point comprises for each attribute of the set of attributes a reference attribute value assigned to the respective attribute. The computer system is configured for performing the following for each multidimensional reference point: For each multidimensional data entry a reference-point-specific distance between the respective multidimensional data entry and the multidimensional reference point is calculated resulting in a set of reference-point-specific distances for the data extent. The respective reference-point-specific distance is calculated using a combination of the attribute values of the respective multidimensional data entry and a combination of the reference attribute values of the multidimensional reference point. A minimum reference-point-specific distance and a maximum reference-point-specific distance of the set of reference-point-specific distances are determined. The minimum reference-point-specific distance and maximum reference-point-specific distance are stored for the data extent as attribute value information for further use with query processing.

BRIEF DESCRIPTION OF THE DRAWINGS

In the following, embodiments of the invention are explained in greater detail, by way of example only, making reference to the drawings in which.

DETAILED DESCRIPTION

Figure 1:
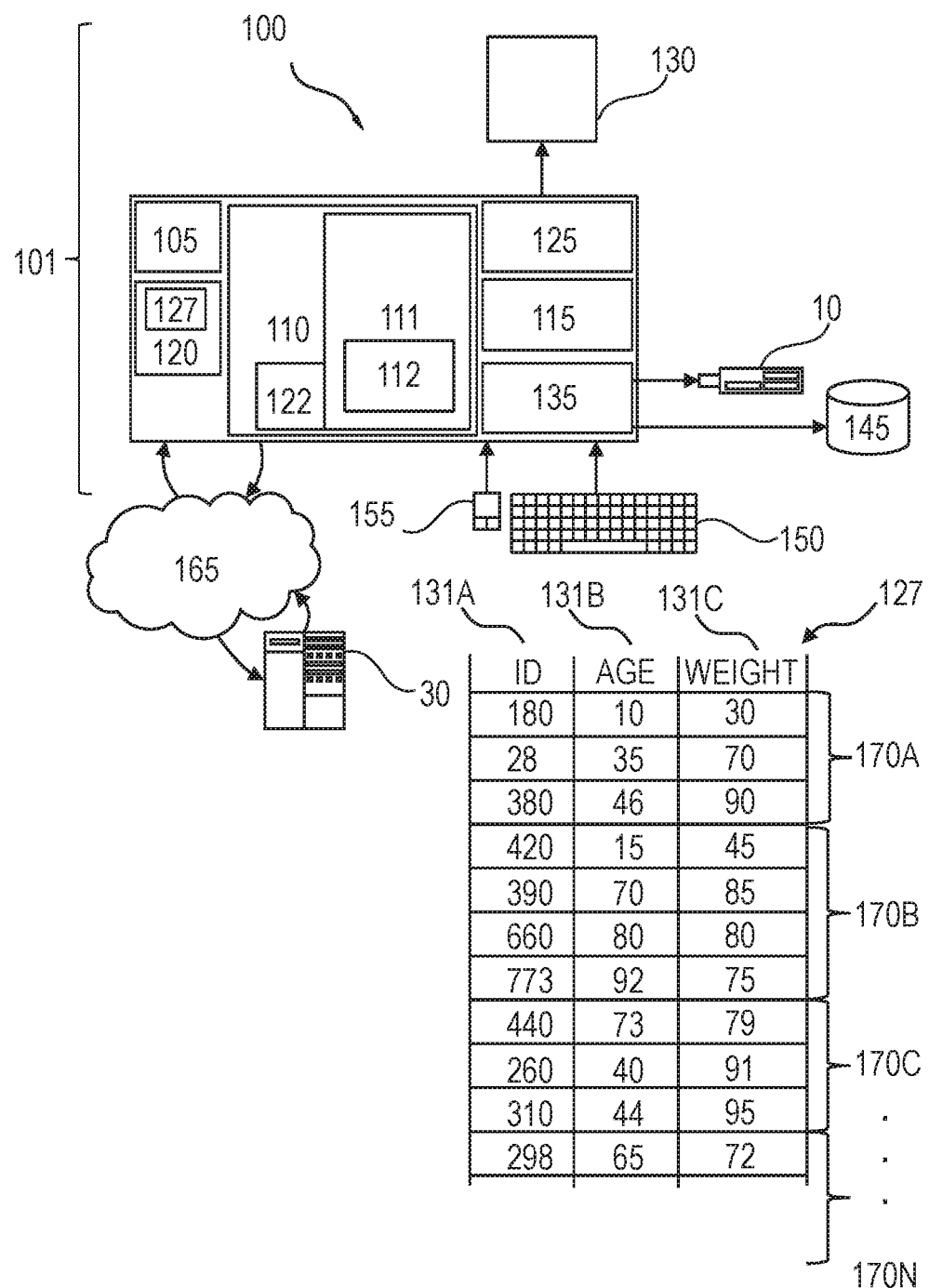
FIG. 1 depicts an exemplary computerized system, suited for implementing a method according to one or more embodiments of the present disclosure.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention relates to the technical field of databases and may be applied to any database implementation including parallel processing implementation, like e.g. Apache Hadoop, massively parallel processing (MPP) architectures, etc.

A main challenge of databases queries is caused by the large amounts of data which need to be read. Embodiments of the method according to the present disclosure may allow efficiently filtering out non-relevant data extents in advance before reading their content, thus significantly decreasing search times.

Embodiments may have the beneficial effect that they allow for limiting the search in advance by taking into account only those data extents which may comprise at least one attribute string value having a distance to a reference point equal to the distance between a search term of the query and the reference point. In other words, only those data extents having a range which at least potentially may comprise the search term are taken into account.

Multidimensional reference points may provide a kind of reference system with coordinates in a multidimensional data space. For all these coordinates maximum and minimum distances may be determined once for each data extent. The resulting attribute value information may be re-used for all the searches performed afterwards. For each search the distances between the multidimensional search term and the multidimensional reference point is determined. The distance between the multidimensional search term and the multidimensional reference point as well as the determined maximum and minimum distances provided by the multidimensional data entries information are used in order to check for each data extent, whether it could comprise the multidimensional search term. Otherwise, the data extent apparently does not comprise any potential matches and may be neglected for the query. Thereby unnecessary computation time may be avoided.

Using the pre-determined maximum and minimum distances of each data extent in order to perform a pre-selection, computational cost may significantly be reduced. The present method may be a key performance enabler for analytical database systems, as it may massively save disk I/O and CPU resources. Using the attribute value information, a preselection of extents may be performed before reading the preselected extents. The attribute value information may comprise information or metadata on the attribute that allows such a preselection.

For example, the maximum and the minimum distance may define a data-extent-specific range of multidimensional data entries of a plurality of attribute comprised by a respective data extent.

The term "extent" as used herein may refer to a logical or physical storage unit (e.g. contiguous area of storage) for storing the data of a data table. The extent may be one of the storage units that is handled by a database management system or an operating system of a computer system. The data extent may for example be the smallest or second smallest storage unit in a hierarchy of storage units used by the database e.g. involving segments and pages.

Using attribute value information associated with each data extent a query may be processed by first determining a read list of data extents that may satisfy the query. For that the attribute value information may be used. For example, if a query condition is 'AGE=35' and 'WEIGHT=70', all data extents may be excluded from or skipped by the query with attribute value information indicating that for all multidimensional data entries comprised by the respective data extent the data-extent-specific range of distances does not comprise a distance of a multidimensional data entry with 'AGE=35' and 'WEIGHT=70'.

Embodiments may have the advantage of enabling faster I/O read by introducing a method for calculating distances between a multidimensional data entry, e.g. comprising attribute values from multiple columns, and a multidimensional reference points. Thereby, the number of rows scanned while data read operations may be limited.

The present disclosure is related to data warehouses and databases. One of the important factors of the data warehouse performance is the hard disk scan speed. The scanning of the disks is usually the bottleneck of the whole system. One of the ways to improve query performance is to limit the number of data extents read from the disk to only those which are required for processing the query. There are several ways of doing that. An efficient way may be to provide attribute value information on the data extents. Each data extent is checked whether it has a chance of containing a multidimensional data entry potentially relevant for a query. Data extents on the disk may be organized based on some predefined rule and values in a plurality of columns. This may allow optimizing queries comprising restrictions on the chosen set of columns.

Low-level statistics in form of attribute value information on data extent level may be created and maintained for a plurality of columns of a data table. Statistics may be created and maintained commonly for a plurality of columns together instead of being created and maintained individually for every single column. The goal of such statistics may be the same as the goal of known single column statistics, i.e. filtering out on predefined checking rules data extents during query processing which do not have a chance to contain any data entries relevant for the respective query.

Embodiments may have the advantage of allowing for easy parallelization in a massively parallel processing (MPP) share nothing environment. Each processing node may cluster only rows assigned to its disk space.

A multidimensional reference point may be used for covering multiple attribute values, in particular attribute values assigned to different columns. For each multidimensional reference point the reference-point-specific minimum and maximum distances between the respective reference points and the multidimensional entries of the data extent are stored in form of attribute information. Thus, the attribute information may contain a duplet comprising a minimum and a maximum distance for each of the multidimensional reference points.

Embodiments may provide an alternative approach for organizing data extents on a disk in order to limit the number of data extents read. Embodiments may have the advantage of better fitting to any 'continues' data types, like doubles, floats, geospatial data etc.

In order to take into account multidimensional data entries comprising attribute values from different columns which may dependent on each other, common attribute value information may be created for a set of columns comprised by a data extent.

This may be done in the following way: The set of columns to be grouped together under one set of statistics may be defined. The range of data within this set of columns may be calculated. A set of reference points may be defined, e.g. based on the data spread estimation. Alternatively, an equal spread of data may be assumed. For every data extent only minimum and maximum distances from the reference points are kept, wherein distances may be defined in different way. If the query comprises any restriction on any subset of the columns participating in the common statistics, for each data extent it is checked during query execution, whether the restriction defined by the query has any intersection with the range of one of the data extents defined by the minimum and maximum distances.

According to embodiments, the calculating of the reference-point-specific distances comprises: For each attribute of the set of attributes an attribute-specific distance between the attribute value of the respective multidimensional data entry assigned to the respective attribute and the reference attribute value of the multidimensional reference point assigned to the respective attribute is calculated. The reference-point-specific distance of the respective multidimensional data entry is calculated by combining the respective attribute-specific distances.

According to embodiments, the calculated distances are minimum numerical distances. According to embodiments, the minimum numerical distances are determined according to a weighted Euclidean metric:

$$d(D, R) = \left(\sum_{i=1}^{N} w_i \cdot (D_i - R_i)^2\right)^{\frac{1}{2}},$$

N being the number of dimensions of the respective multidimensional reference point $R=(R_1, R_2, R_3, \ldots, R_N)$, of the respective multidimensional data entry $D=(D_1, D_2, D_3, \ldots, D_N)$ and of a multidimensional weighting vector $w=(w_1, w_2, w_3, \ldots, w_N)$. These embodiments may have the beneficial effect that an efficient way of calculating distances in a multidimensional space may be provided. According to embodiments, $w_i=1$ for all $i \in [1; N]$. In this case all distances are weighted equally. According to embodiments, at least one $R_i > 0$ with $i \in [1; N]$, i.e the multidimensional reference point not coincides with the origin of a coordinate system with each coordinate being assigned to an attribute. According to an alternative embodiment, $R_i=0$ for all $i \in [1; N]$, i.e. the multidimensional reference point coincides with the origin of a coordinate system with each coordinate being assigned to an attribute.

For example, three different types of multidimensional reference points may be considered: multidimensional reference points specific to a particular domain; general multidimensional reference points for which a transformation may not be easily performed, while distance measuring is still doable; string and text type multidimensional reference points.

A first example for group 1) may be provided in form of dates comprising three attribute values, i.e. being three-dimensional, year, month, and day (yyyy, mm, dd). A measurement of distances between dates may for example be provided in terms of the number of days. A second example may be provided in form of timestamps comprising seven points, i.e. being seven-dimensional, year, month, day, hour, minute, second, and millisecond (yyyy, mm, dd, H24, mi, ss, sss). A measurement for distances between timestamps may for example be provided in terms of the number of milliseconds. The handling of timestamps may be leveraged by assuming a starting time which is defined as zero and measuring all later timestamps in terms of the number of milliseconds between the starting time and the time of the respective timestamp. Thereby, timestamps may be converted to single numeric value easy to be compared.

Group 2) comprises multidimensional points which are logically related. In such a case, the attribute values may not be transformed to a common dimensional basis, but for example an appropriate distance calculation be used. A distance d(D, R) between a multidimensional data entry D and a multidimensional reference point R may be defined based on a Euclidean metric:

$$d(D, R) = \left(\sum_{i=1}^{N} w_i \cdot (D_i - R_i)^2\right)^{\frac{1}{2}}$$

In case of multidimensional points in RGB space, for example multidimensional reference point R=(10, 20, 30) and multidimensional data entry D=(25, 35, 15) with $w_i=1$ for all $i \in [1; N]$ may be considered:

$$d(D, R) =$$
$$\text{power}(\text{power}(|10 - 25|, 2) + \text{power}(|20 - 35|, 2) + \text{power}(|30 - 15|, 2),$$
$$1/2) = \text{power}(\text{power}(15, 2) + \text{power}(15, 2) + \text{power}(15, 2), 1/2) =$$
$$\text{power}(675, 1/2) \approx 25, 98.$$

For example, geo-spacial data, wherein each part of geo-spacial data is treated as a separate dimension, i.e. a separate attribute, may result in a three-dimensional space for which distances may be computed analogously to the above defined example for RGB space.

For example, medical characteristics, like e.g. age, weight, height, sex, and/or blood pressure, which may be handled in an analogous way, wherein each characteristic is considered as a separate dimension, i.e. a separate attribute. For characteristics like sex digits may be used representing code for W and M letters.

According to embodiments, the attribute values comprise numerical symbols. According to embodiments, the attribute values comprise alphabetical symbols. According to embodiments, the attribute values comprise alphanumerical symbols.

According to embodiments, the data entries being provided in form of character (CHAR) and/or variable character (VARCHAR) fields. This may have the advantage that the present method may be efficiently applied to databases comprising entries of alphanumerical type of data, in particular character or variable character field data.

According to embodiments, the distances calculated are minimum edit distances. According to embodiments, the minimum edit distance is calculated using one of the following metrics: Hamming-Metric, Levenshtein-Metric, Damerau-Levenshtein-Metric. These embodiments may have the beneficial effect that for arbitrary strings, i.e. sequences of symbols, a distance may be defined.

According to embodiments, at least two attribute values of each multidimensional data entry have a dimensional basis different from each other. According to embodiments, the respective at least two attribute values with different dimensional basis are transformed to a common dimensional basis. According to embodiments, at least two attribute values of each multidimensional data entry have the same dimensional basis. According to embodiments, all attribute values of the data extent have the same dimensional basis.

According to embodiments, the attribute values of each data entry are combined to a new common value for the respective data entry used for calculating the distances. These embodiments may have the beneficial effect that an efficient handling of multidimensional data is enabled as described above for group 1).

According to embodiments, the attribute values of the different dimensional basis are multiplied with different weighting factors, while ignoring the dimensions. According to embodiments, the numerical values of the attribute values are used for calculating the distances, while ignoring their individual dimensional basis. These embodiments may have the beneficial effect that attribute values of different dimensional may easily be handled.

According to embodiments, the data extent is a data extent of a set of data extents comprised by the database. The set of data extents comprises a plurality of data extents. The above embodiments of the method according to the present disclosure are performed for each data extent of the set of data extents.

According to embodiments, generating the data extents of the set of data extents comprises: A plurality of multidimensional data elements are clustered using a cluster analysis based on distances between the multidimensional data elements. Each multidimensional data element comprises for each attribute of the set of attributes an attribute value assigned to the respective attribute. Each of the multidimensional data elements of a common cluster is assigned to the same data extent of the set of data extents in form of a multidimensional data entry. These embodiments may have the beneficial effect that the selectivity of the data extents is increased.

According to embodiments, data extents may be organized according to a pre-defined set of multidimensional reference points. The data spread within a multicolumn domain may be estimated. A set of reference points which covers the multicolumn domain may be defined. multidimensional data entries may be written to the disk according to an order based on the distance of the respective multidimensional data entries from the pre-defined multidimensional reference points.

This may be done in the following way: A set of columns to be grouped together under one set of statistics may be defined. The spread of data within this set of columns may be calculated. A set of reference points may be defined, e.g. based on the data spread estimation. Alternatively, an equal spread of data may be assumed. For every data extent only minimum and maximum distances from the reference points are kept, wherein distances may be defined in different way. If the query comprises any restriction on any subset of the columns participating in the common statistics, for each data extent it is checked during query execution, whether the restriction defined by the query has any intersection with the range of one of the data extents defined by the minimum and maximum distances.

Consider a set of reference points spread within the domain of a set of columns. Embodiments may allow re-organizing the data on the disk in such way that after the re-organization and attribute value information calculations the intersections between ranges assigned to data extents are significantly smaller in comparison to a random distribution.

A certain number of multidimensional reference points may be provided. According to embodiments, the following method may be executed: A data re-organization may be executed based on clustering. The data may be clustered using a known clustering algorithm into M data buckets. Each data bucket may be written into one data extent. As this may require moving significant parts of data within the database, it may be advantageous to do this offline or with limited number of queries running on the system. A set of multidimensional reference points may be defined, which may be redefined based on data specifics. The final number of data extents may be calculated in advance. The number of data extents may be provided by the number of data elements divided by size of a data extent.

According to embodiments, the multidimensional data elements are clustered such that a maximum extension of each of the clusters is limited by a predefined limit. These embodiments may have the beneficial effect that the data range indicated by the attribute value information is limited and thus a certain minimum selectivity of the attribute value information may be ensured.

According to embodiments, the multidimensional data elements are clustered such that the maximum number of data entries of each resulting data extent is limited by a predefined upper limit. These embodiments may have the beneficial effect that the resulting data extents do not become too large.

According to embodiments, the multidimensional data elements are clustered such that the minimum number of data entries of each resulting data extent is limited by a predefined lower limit. According to embodiments, the multidimensional data elements are clustered such that each resulting data extent comprises the same number of multidimensional data entries.

According to embodiments, the multidimensional data elements are clustered around the multidimensional reference points of the database. These embodiments may have the beneficial effect that the data extents are structured depending on the multidimensional reference points. Thus the multidimensional reference points become data-extent-specific multidimensional reference points.

According to embodiments, each cluster comprises a center. The multidimensional reference points of the database are determined such that a multidimensional reference point is located at the center of each cluster. These embodiments may have the beneficial effect that data-extent-specific multidimensional reference points providing a high selectivity are determined.

According to embodiments, the method further comprises processing a query in the database. The query comprises a multidimensional search value. Processing the query comprises: A reference-point-specific search distance between the multidimensional search value and each multidimensional reference point of the set of multidimensional reference points is determined resulting in a set of one or more reference-point-specific search distances. A query-specific subset of the set of data extents is determined. The query-specific subset comprises all data extents for which each reference-point-specific search distance of the set of reference-point-specific search distances lies within the limits provided by the minimum reference-point-specific distance and the maximum reference-point-specific distance of the reference point of the respective reference-point-specific search distance stored as attribute value information for the respective data extent. The multidimensional data entries of the data extents of the query-specific subset are searched for the multidimensional search value.

FIG. 1 depicts an exemplary computerized system, suited for implementing embodiments of the method as involved in this disclosure. It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions 112 e.g. instructions to manage databases such as a database management system. The memory 110 may further comprise a query optimizer. The query optimizer may comprise instructions e.g. software instructions that when executed may provide a query execution plan for executing a given query.

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. When a source program, then the program needs to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

The system 100 may have access to at least one data table (or data set) 127. For example, the software 112 may receive (automatically or upon request) as input the data table 127, or may download the data table 127 from a source system that is e.g. connected to the system 100. For simplification purpose data table 127 is shown as part of storage 120 but it can be stored in memory 110 or any other storage to which the system 100 has access.

The data table 127 may comprise one or more columns 131A-C, wherein each column is represented by a respective attribute (e.g. 'ID' 131A, 'AGE' 131B, 'WEIGHT' 131C). The rows or records of the data table 127 may comprise values of the attributes.

The term "data table" or data set as used herein refers to a collection of data that may be presented in tabular form. Each column in the data table may represent a particular variable or attribute. Each row in the data table may represent a given member, record or entry of the data table.

The data table 127 comprises data of a set of data extents 170A-N. Each data extent 170A-N may be assigned with attribute value information. For example, data extent 170A may comprise three two-dimensional data entries each comprising an attribute string value of a first attribute 'AGE' and a second attribute 'WEIGHT', i.e. [10, 30], [35, 70], and [46, 90]. In this case the multidimensional data entries comprise attribute values from multiple columns of the table 127. The attribute value information may indicate as a range of the two-dimensional data entries comprised by the data extent. The range may for example be limited by a minimum reference-point-specific distance and a maximum minimum reference-point-specific distance of the two-dimensional data entries to a two-dimensional reference point.

While FIG. 1 only shows a few attributes, it will be appreciated that numerous attributes may exist or may be used.

Figure 2:
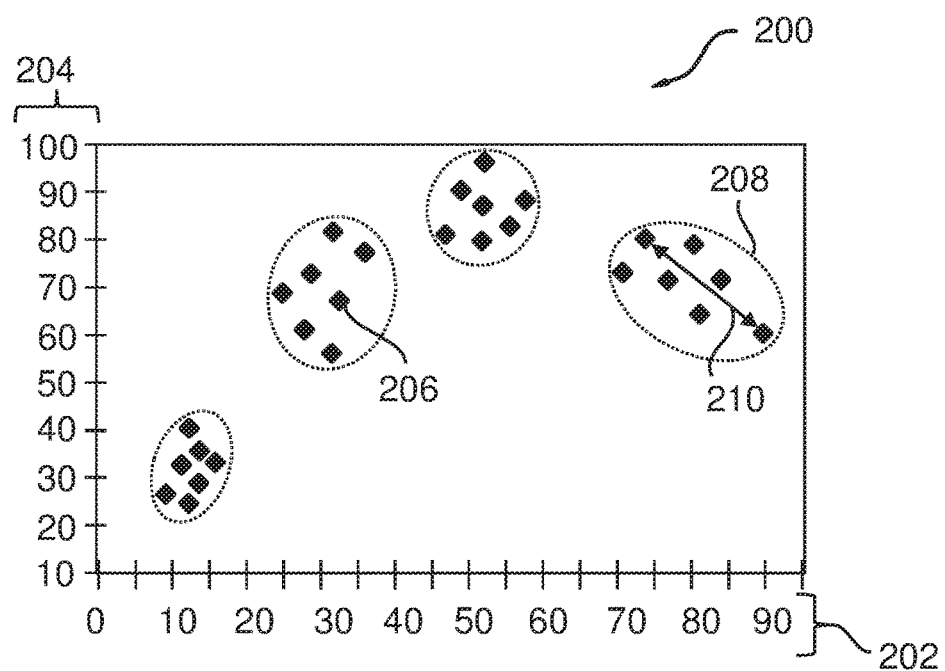
FIG. 2 depicts schematic diagrams illustrating a clustering of multidimensional data elements according to one or more embodiments of the present disclosure.

FIG. 2 depicts schematic diagrams illustrating a clustering of multidimensional data elements. Graph 200 shows a plurality of multidimensional data elements 206. Each multidimensional data element 206 comprises for each attribute of the set of attributes an attribute value assigned to the respective attribute. Each attribute may correspond to a column of a table such that multidimensional data elements comprises data values from different columns. The multidimensional data elements 206 may for example be two-dimensional data elements, i.e. comprising attribute value for two attributes. The two attributes may for example be age 202 and weight 204. Thus, the two-dimensional data elements 206 may be depicted by a two-dimensional graph like graph 200. In order to improve the organization of the multidimensional data elements 206 in a table of a database, the clusters 208 are identified. For this purpose, the multidimensional data elements 206 are clustered using a cluster analysis based on distances between the multidimensional data elements 206. The distances between the multidimensional data elements 206 may for example be taken into account directly or indirectly, e.g. in form of distances to reference points and/or distances between the reference points.

The multidimensional data elements 206 may for example be clustered such that a maximum extension 210 of each of the clusters 208 is limited by a predefined limit. The maximum extension 210 may be the largest distance between two of the multidimensional data elements 206 comprised by the cluster 208. Depending on the cluster analysis algorithm used, each cluster may comprise the same number of multidimensional data elements 206. According to alternative embodiments, the number of multidimensional data elements 206 may for example lie within a range limited by a predefine maximum and minimum number of number of multidimensional data elements 206.

The multidimensional data elements 206 of the same cluster 208 are assigned to the same data extent of the set of data extents. Each multidimensional data elements 206 may be added to the respective data extent in form of a multidimensional data entry. The data entry may comprise attribute values assigned to different columns of a table. According to embodiments a multi-column table may be provided which is already organized in form of a plurality of data extent. The data extents may be re-organized by clustering the multidimensional data entries of the data extents, i.e. the multidimensional data elements 206 corresponding to the multidimensional data entries. Based on the cluster analysis the multidimensional data entries may be re-arranged to new data extents. According to embodiments, a plurality of multidimensional reference points may be provided before clustering the multidimensional data elements 206. In this case, the multidimensional data elements 206 may be clustered around the multidimensional reference points such that a multidimensional reference point ids located at a center of each cluster. In an alternative embodiment, multidimensional reference points may be determined after clustering of the multidimensional data elements 206 determined such that a multidimensional reference point is located at the center of each cluster 208. Thus a set of data-extent-specific, i.e. cluster-specific, multidimensional reference points may be provided. The center of a cluster may for example be determined by fitting a multidimensional geometrical object, like e.g. a circle or ellipse in two dimensions or a sphere or ellipsoid in three dimensions, and identifying the geometric center of the respective multidimensional geometrical object. Alternatively, the multidimensional data elements 206 may each be assigned with a weighting factor, e.g. the same weighting factor, the arithmetic mean of all multidimensional data elements 206 weighted by a respective weighting factor be calculated resulting a center of mass.

Figure 3:
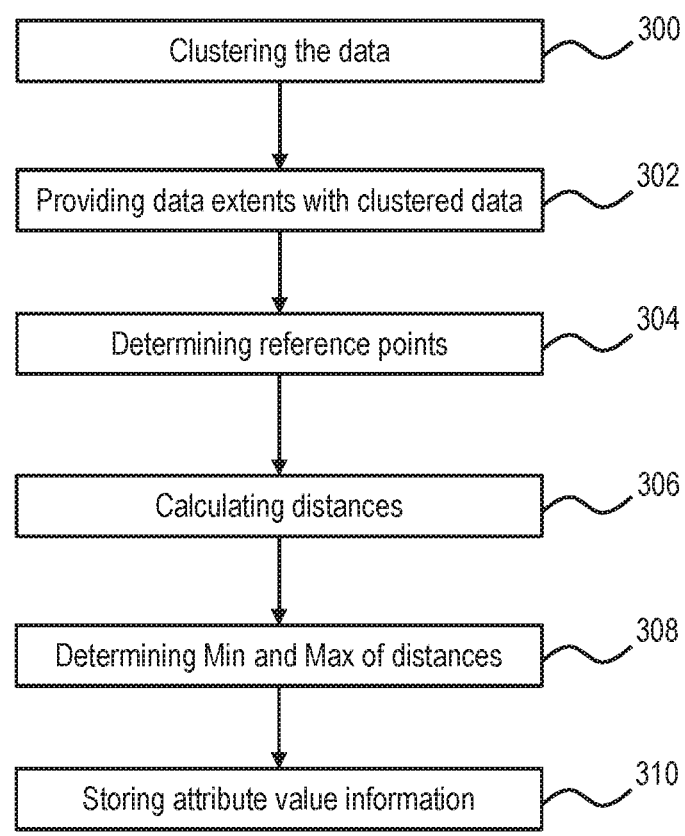
FIG. 3 depicts a schematic flow diagram of an exemplary method for providing attribute value information according to one or more embodiments of the present disclosure.

FIG. 3 depicts a schematic flow diagram of an exemplary method for providing attribute value information according to one or more embodiments of the present disclosure. In block 300, a plurality of multidimensional data elements is clustered using a cluster analysis. In block 302, each of the multidimensional data elements of a common cluster is assigned to the same data extent of the set of data extents in form of a multidimensional data entry. Thus, a set of data extents comprising multidimensional data entries with attribute values distributed to the data extents according to the clustering. In block 304, multidimensional reference points are determined. For example, the centers of the clusters of block 330 may be used as multidimensional reference points. In block 306, for each multidimensional data entry a reference-point-specific distance between the respective multidimensional data entry and a multidimensional reference point is calculated resulting in a set of reference-point-specific distances for the data extent. The respective reference-point-specific distance is calculated using a combination of the attribute values of the respective multidimensional data entry and a combination of the reference attribute values of the multidimensional reference point. In block 308, a minimum reference-point-specific distance and a maximum reference-point-specific distance of the set of reference-point-specific distances are determined. In block 310, the minimum reference-point-specific distance and maximum reference-point-specific distance are stored for the data extent as attribute value information for further use with query processing.

Figure 4:
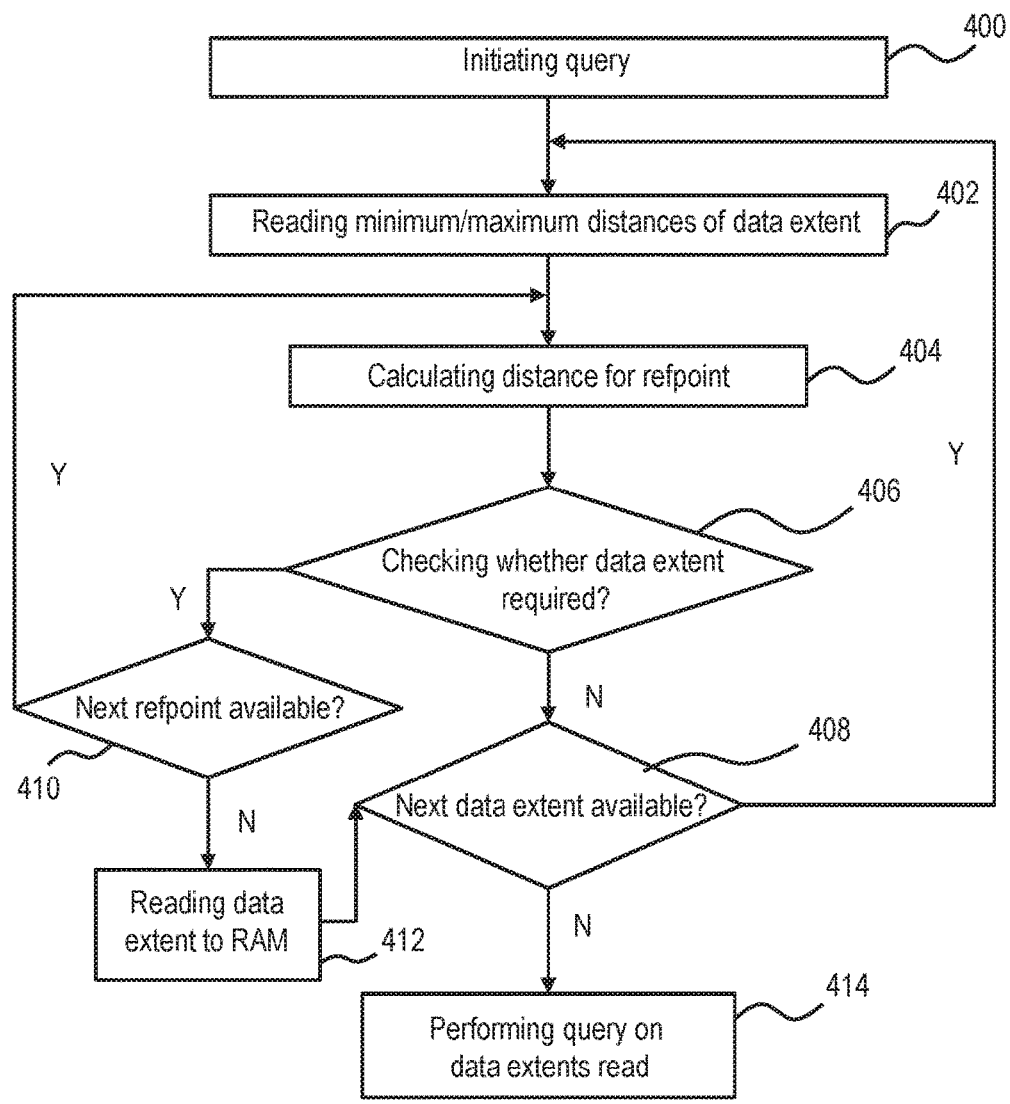
FIG. 4 depicts a schematic flow diagram of an exemplary query processing using multidimensional attribute value information.

FIG. 4 depicts a schematic flow diagram of an exemplary query processing using the attribute value information of FIG. 3. In block 400, a query comprising a multidimensional search value is initiated. The multidimensional search value may comprise a set of attribute value with an attribute value assigned to each attribute of the set of attributes. In block 402, the attribute value information for a first data extent, i.e. a minimum distance Min and a maximum distance Max, for a first multidimensional reference point is read to a RAM of a computer system for processing the query. In case the attribute value information of the data extent comprises minimum and maximum distances for more than one multidimensional reference point, all minimum and maximum distances may be read to the RAM. In block 404, the search distance of the multidimensional search value for the multidimensional reference point is calculated. The search distance is calculated using a combination of the attribute values of the respective multidimensional search value and a combination of the reference attribute values of the multidimensional reference point. Based on the maximum and minimum distance for the respective multidimensional reference point read in block 402 and the search distance calculated in block 404, it is checked in block 406, whether the data extent is required for the query. It is checked, whether there is a chance that the search value lies within the data range of the data extent defined by Min and Max. In case the data extent is required, the method proceeds with block 410. In block 410, it is checked, whether a further multidimensional reference point is available for which corresponding minimum and maximum distances have been assigned to the attribute value information of the data extent. In case, a further data-extent-specific reference point assigned to the data extent is available, the method continuous with calculating the search distance for the further multidimensional reference point according to block 404. In case, the minimum and maximum distances assigned to the respective further multidimensional reference point have not yet been read to the RAM in block 402, they may be read at this stage.

In case, no further multidimensional reference point is available, the data extent is read to the RAM of the computer system in block 412 and the method continuous in block 408 by checking for further available data extents. In case a further data extent is available, the method continuous with block 402 for the further data extent. In case no further data extent is available, the query is performed on the data extents read to the RAM which form a query-specific set of data extents. It is searched for the multidimensional search value in the multidimensional data entries of the data extents of the query-specific set.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A computer program product comprising a computer-readable storage medium having computer-readable program code embodied therewith for providing attribute value information for a data extent comprised by database, the data extent comprising a set of multidimensional data entries, each multidimensional data entry comprising for each attribute of a set of attributes an attribute value assigned to the respective attribute, the database further comprising a set of one or more multidimensional reference points, each multidimensional reference point comprising for each attribute of the set of attributes a reference attribute value assigned to the respective attribute, the computer-readable program code being configured to implement a method comprising:
    calculating for each multidimensional data entry a reference-point-specific distance between the respective multidimensional data entry and the multidimensional reference point resulting in a set of reference-point-specific distances for the data extent, the respective reference-point-specific distance being calculated using a combination of the attribute values of the respective multidimensional data entry and a combination of the reference attribute values of the multidimensional reference point;
    determining a minimum reference-point-specific distance and a maximum reference-point-specific distance of the set of reference-point-specific distances;
    storing for the data extent as attribute value information for further use with query processing the minimum reference-point-specific distance and maximum reference-point-specific distance.

2. The computer program product of claim 1, wherein calculating of the reference-point-specific distances comprises:
    calculating for each attribute of the set of attributes an attribute-specific distance between the attribute value of the respective multidimensional data entry assigned to the respective attribute and the reference attribute value of the multidimensional reference point assigned to the respective attribute;
    calculating the reference-point-specific distance of the respective multidimensional data entry by combining the respective attribute-specific distances.

3. The computer program product of claim 1, wherein the calculated distances being minimum numerical distances.

4. The computer program product of claim 3, wherein the minimum numerical distances being determined according to a weighted Euclidean metric:

$$d(D, R) = \left(\sum_{i=1}^{N} w_i \cdot (D_i - R_i)^2\right)^{\frac{1}{2}},$$

N being the number of dimensions of the respective multidimensional reference point $R=(R_1, R_2, R_3, \ldots, R_N)$, of the respective multidimensional data entry $D=(D_1, D_2, D_3, \ldots, D_N)$ and of a multidimensional weighting vector $w=(w_1, w_2, w_3, \ldots, w_N)$.

5. The computer program product of claim 4, wherein $w_i=1$ for all $i \in [1; N]$.

6. The computer program product of claim 1, wherein the attribute values comprising alphanumerical symbols.

7. The computer program product of claim 1, wherein at least two attribute values of each multidimensional data entry having a dimensional basis different from each other.

8. The computer program product claim 7, wherein the respective at least two attribute values with different dimensional basis being transformed to a common dimensional basis.

9. The computer program product of claim 1, wherein at least two attribute values of each multidimensional data entry having the same dimensional basis.

10. The computer program product of claim 1, wherein the attribute values of each data entry are combined to a new common value for the respective data entry used for calculating the distances.

11. The computer program product of claim 1, wherein the data extent being a data extent of a set of data extents comprised by the database, the set of data extents comprising a plurality of data extents, the method being performed for each data extent of the set of data extents.

12. The computer program product of claim 11, wherein generating the data extents of the set of data extents comprises:
    clustering a plurality of multidimensional data elements using a cluster analysis based on distances between the multidimensional data elements, each multidimensional data element comprising for each attribute of the set of attributes an attribute value assigned to the respective attribute;
    assigning each of the multidimensional data elements of a common cluster in form of a multidimensional data entry to the same data extent of the set of data extents.

13. The computer program product of claim 12, the multidimensional data elements being clustered such that the maximum number of data entries of each resulting data extent being limited by a predefined upper limit.

14. The computer program product of claim 12, wherein the multidimensional data elements being clustered such that the minimum number of data entries of each resulting data extent being limited by a predefined lower limit.

15. The computer program product of claim 12, wherein the multidimensional data elements being clustered around the multidimensional reference points of the database.

16. The computer program product of claim 12, wherein each cluster comprising a center, the multidimensional reference points of the database being determined such that a multidimensional reference point is located at the center of each cluster.

17. The computer program product of claim 12, wherein the method further comprising processing a query in the database, the query comprising a multidimensional search value, processing the query comprising:
   determining a reference-point-specific search distance between the multidimensional search value and each multidimensional reference point of the set of multidimensional reference points, resulting in a set of one or more reference-point-specific search distances;
   determining a query-specific subset of the set of data extents, the query-specific subset comprising all data extents for which each reference-point-specific search distance of the set of reference-point-specific search distances lies within the limits provided by the minimum reference-point-specific distance and the maximum reference-point-specific distance of the reference point of the respective reference-point-specific search distance stored as attribute value information for the respective data extent;
   searching for the multidimensional search value in the multidimensional data entries of the data extents of the query-specific subset.

18. The computer program product of claim 12, wherein the multidimensional data elements being clustered such that each resulting data extent comprises the same number of multidimensional data entries.

19. A computer system for providing attribute value information for a data extent comprised by a database, the data extent comprising a set of multidimensional data entries, each multidimensional data entry comprising for each attribute of a set of attributes an attribute value assigned to the respective attribute, the database further comprising a set of one or more multidimensional reference points, each multidimensional reference point comprising for each attribute of the set of attributes a reference attribute value assigned to the respective attribute, the computer system being configured for:
   calculating for each multidimensional data entry a reference-point-specific distance between the respective multidimensional data entry and the multidimensional reference point resulting in a set of reference-point-specific distances for the data extent, the respective reference-point-specific distance being calculated using a combination of the attribute values of the multidimensional data entry and a combination of the reference attribute values of the respective multidimensional reference point;
   determining a minimum reference-point-specific distance and a maximum reference-point-specific distance of the set of reference-point-specific distances;
   storing for the data extent as attribute value information for further use with query processing the minimum reference-point-specific distance and maximum reference-point-specific distance.

* * * * *